Figures 1, 2:
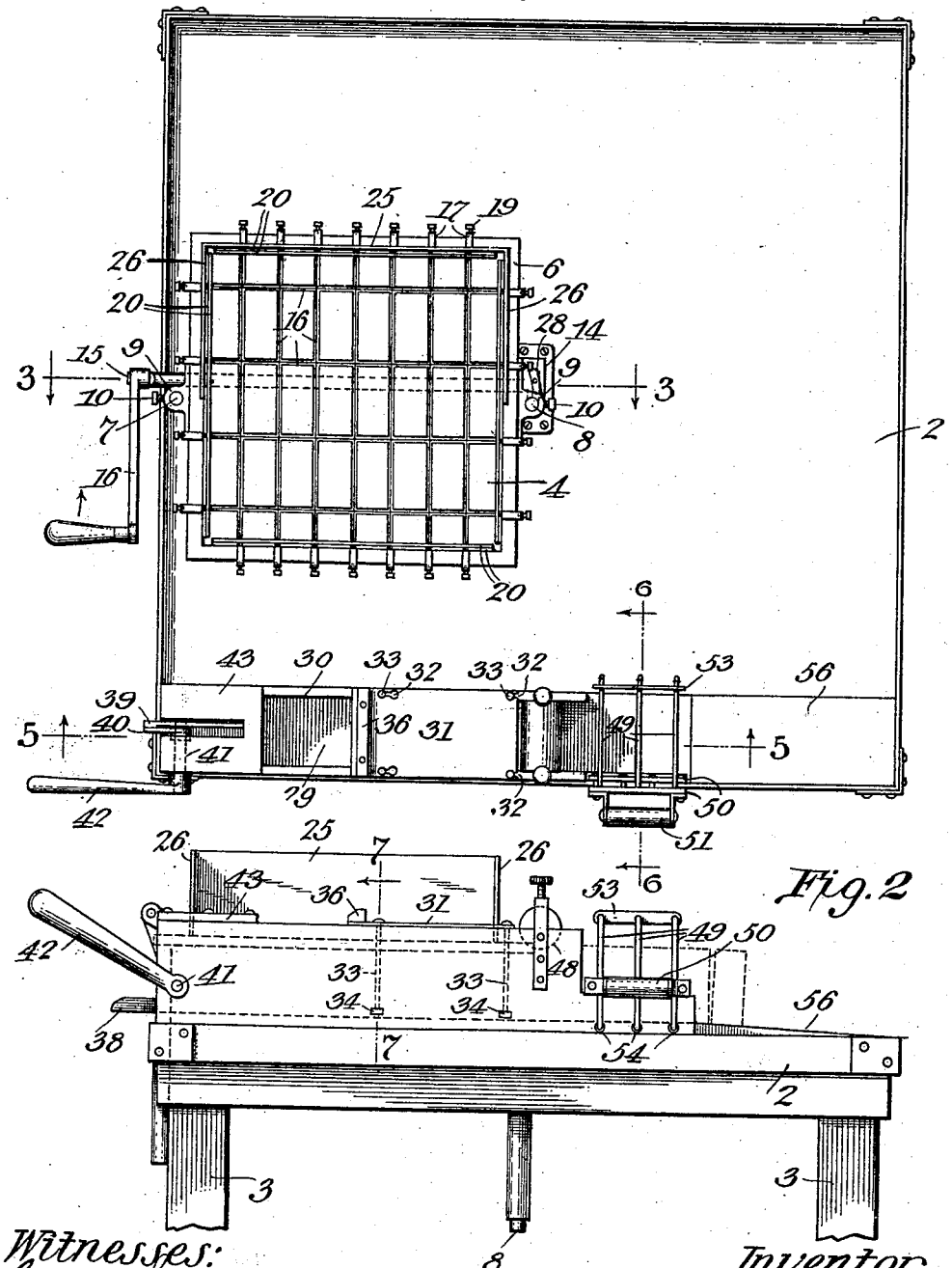

No. 886,088. PATENTED APR. 28, 1908.
R. F. STEWART.
BUTTER CUTTING MACHINE.
APPLICATION FILED AUG. 23, 1907.

3 SHEETS—SHEET 1.

Witnesses:
G. M. Stucker
D. E. Lauterman

Inventor,
Richard F. Stewart.
By Byers, Cushman & Rea
Attorneys.

THE NORRIS PETERS CO., WASHINGTON, D.C.

No. 886,088. PATENTED APR. 28, 1908.
R. F. STEWART.
BUTTER CUTTING MACHINE.
APPLICATION FILED AUG. 23, 1907.
3 SHEETS—SHEET 2.
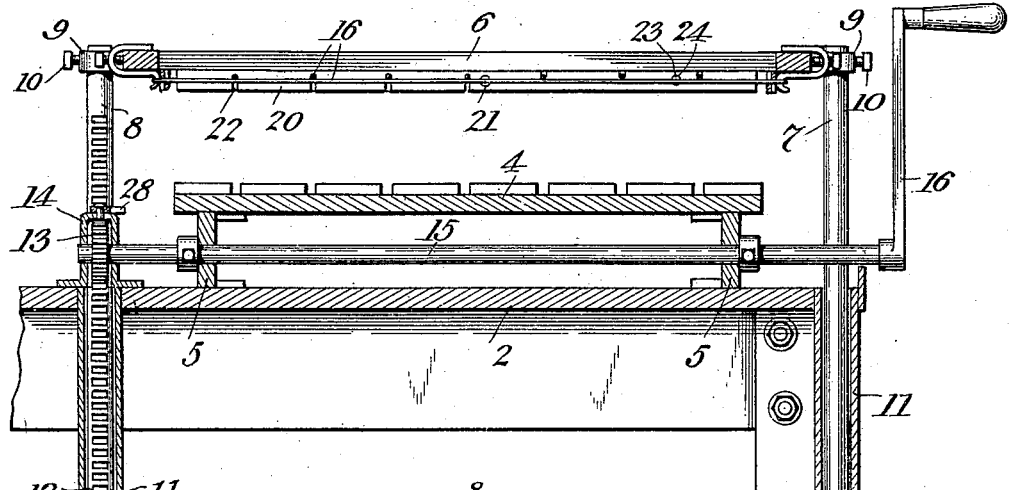
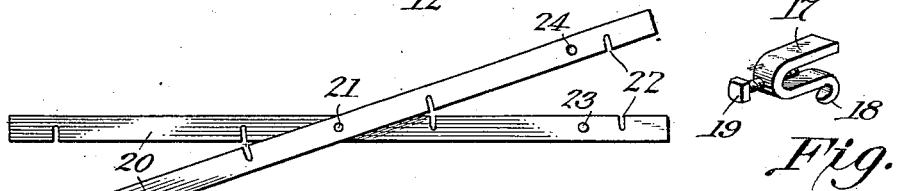
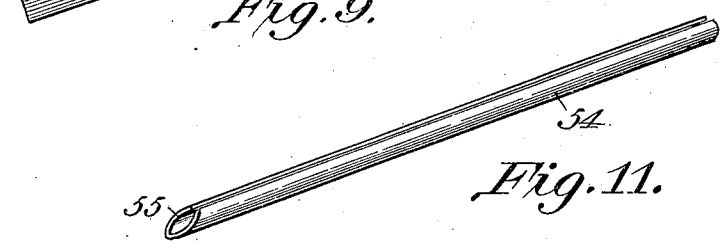
Witnesses:
Inventor,
Richard F. Stewart.
By Meyers, Cushman & Rea
Attorneys.

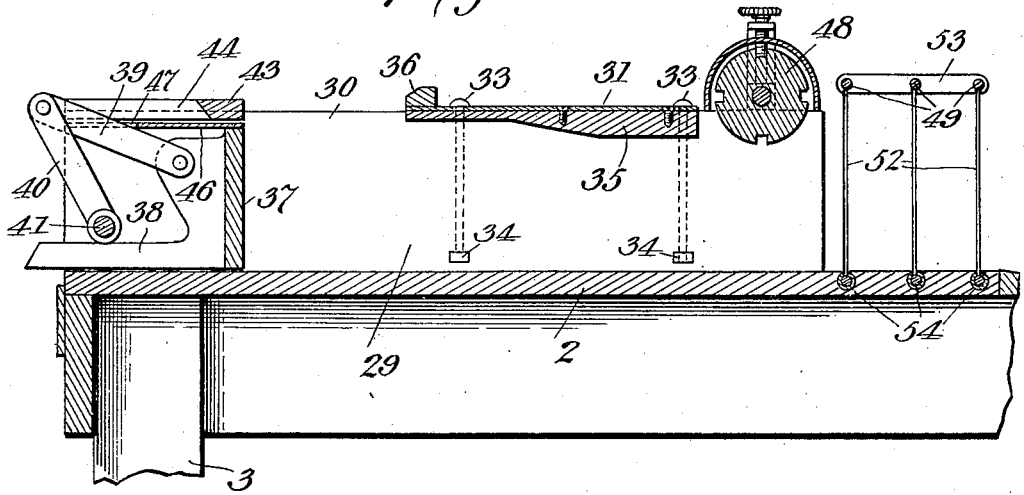
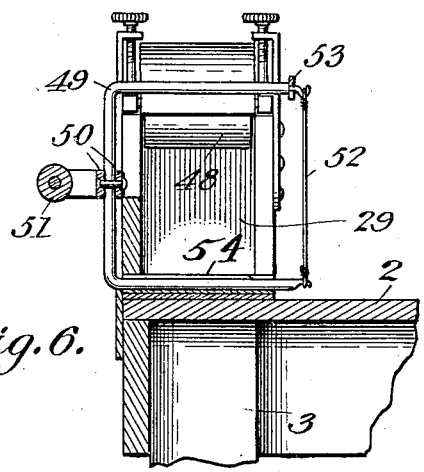
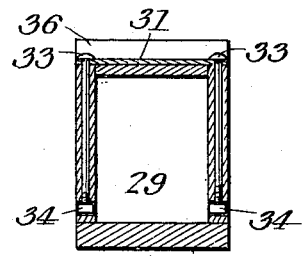
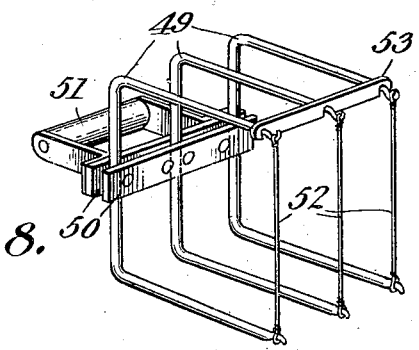

UNITED STATES PATENT OFFICE.

RICHARD F. STEWART, OF POCANTICO HILLS, NEW YORK, ASSIGNOR TO AMERICAN BUTTER CUTTING MACHINE COMPANY, OF NEW YORK, N. Y., A CORPORATION OF NEW YORK.

BUTTER-CUTTING MACHINE.

No. 886,088.  Specification of Letters Patent.  Patented April 28, 1908.

Application filed August 23, 1907. Serial No. 389,823.

*To all whom it may concern:*

Be it known that I, RICHARD F. STEWART, a citizen of the United States, residing at Pocantico Hills, in the county of Westchester and State of New York, have invented new and useful Improvements in Butter-Cutting Machines, of which the following is a specification.

The present invention relates to butter cutting machines, and more particularly to that type of machine which is designed to take package or tub butter, cut it into slabs, mold it, print the molded slabs, and then sever them into prints of the desired dimensions. Machines of this same general type are exhibited in my Patent No. 804,563, dated Nov. 14, 1905, and numerous other patents granted to me on that date.

The machine forming the subject-matter of this present case contains many improvements on and developments of the machines of my earlier patents, which improvements will be set forth in detail in the description hereinafter, reference being had to the accompanying drawings in which—

Figure 1 is a plan view of a machine embodying my invention. Fig. 2 is a side elevation looking from the lower side of Fig. 1. Fig. 3 is a cross-section on an enlarged scale, on the line 3—3, Fig. 1, looking in the direction of the arrows. Fig. 4 is a detail view of the driving gear and rack for the cutter frame. Fig. 5 is a sectional view, on an enlarged scale, on line 5—5, Fig. 1, looking in the direction of the arrows. Fig. 6 is a transverse sectional view of the mold box on line 6—6, Fig. 1, looking in the direction of the arrows. Fig. 7 is a transverse sectional view of the mold box on line 7—7, Fig. 2. Fig. 8 is a perspective view of the print cutter. Fig. 9 is a detail view of the wire engaging and positioning gage. Fig. 10 is a perspective view of one of the wire clamps for the outer frame. Fig. 11 is a perspective view of one of the slotted tubes which form the runways for the print cutter frame.

Referring to the drawings by numerals, like numbers indicating like parts in the several views, 2 indicates the table or support for the machine, preferably supported by legs 3. Mounted upon said table 2 is the usual cutting bed 4, which has the cross-grooved surface to receive the cutting wires, the said bed being mounted on blocks 5 secured to the table 2. Mounted above said cutting-bed is a cutter-frame 6, preferably rectangular form, said cutter-frame 6 being provided with two supporting standards 7 and 8, which standards are connected with the cutter frame by means of perforated lugs 9, in which lugs the upper ends of the standards 7 and 8 are removably and adjustably secured so that they may be readily adjusted or removed in disassembling the machine, clamping screws 10 being provided to secure the standards to the frame. The said standards 7 and 8 are of unequal length, and traverse guide tubes 11 mounted on the table and depending therefrom, and the longer of the two standards 8 is provided on one side with a rack 12 adapted to engage a driving gear 13 mounted in a housing 14, through which the standard 8 passes. The said driving gear 13 is fixed to a shaft 15 journaled in the supporting blocks 5 for the cutter bed, said driving shaft 15 being provided with a handle 16 by means of which it may be rotated, although it is obvious that any other suitable driving means may be employed.

When the shaft 15 is rotated it will be apparent that the cutter frame 6 will, through the driving gear 13 engaging the rack 12 on the standard 8, be raised or lowered according to the direction of rotation of the driving shaft, and the movement of the cutter frame 6 will be rendered accurate, and its horizontal position with respect to the cutting bed 4 maintained, by the standards 7 and 8 as they traverse the depending guide tubes 11. The said cutting frame 6 is provided with the crossed cutting wires 16, these wires being secured to the sides of the cutter frame by means of the U-shaped clamps 17, which are slipped on to the cutter frame in the manner shown in Fig. 3, the loops at the ends of the cutting wires taking over hooks 18 formed on the lower limbs of the clamps. In order to adjust the clamps 17, and tension the wires 16, I provide the adjusting screws 19 in the head of the U-shaped clamps, so that by setting up these screws 19 the clamps 17 may be drawn outwardly and the wires brought to the proper tension.

It is obvious that the clamps 17 may be adjusted along the sides of the cutter frame 6 as desired, in order to secure different sizes of blocks, but in order to accurately gage the cutting wires after they have received their preliminary adjustment by means of the clamps 17, I preferably provide a gage composed of two plates 20 which are pivotally connected at 21. These plates 20 are provided on opposite sides of the central pivotal point 21 with inclined slots 22 in their opposite edges, the slots in one plate registering with the slots in the other when the plates are swung to parallel position. When these slotted plates 20 are slipped over the wires 16 and clamped thereon, they position and lock the wires at uniform distances and prevent their displacement by reason of slipping of the clamps and in order to hold the plates 20 in adjusted and locking position, I preferably provide the lug 23 on one plate to spring into and engage the hole 24 on the other plate.

The operation of the machine thus far described will, it is believed, be obvious, for when it is desired to cut up a package or tub of butter the mass of butter is placed on the cross-grooved cutting bed, the cutter frame 6 having been elevated, and then the driving shaft 15 is rotated and the cutter frame drawn down, whereupon the cutting wires 16 will divide the package of butter into a series of rectangular slabs, the wires dropping into the grooves of the cutter bed so as to completely sever the mass of butter.

In order to support the severed slabs and prevent their toppling over, the cutter frame 6 is preferably provided with a guard plate 25, which, as shown in Figs. 1 and 3, is open at one side and has the inclined side or end wings 26 so that the frame is open at its front adjacent the operator and the slabs may be readily removed from that side, while all danger of the slabs falling from the back or ends of the frame is avoided.

In order that the cutter frame may be swung angularly out of the way when it is elevated and the short leg 7 is withdrawn from the tube 11, I preferably provide the long leg 8 with circumferential ribs 21 near its lower end, which ribs, when the leg is in elevated position as shown in Fig. 4 engage the gear wheel 13 and form a pivot on which the frame may be swung without disengaging it from the machine, and in order to lock the frame in this elevated position I provide a small rack-engaging latch 28 which takes into the teeth of the rack 12 when the standard 8 has been given a quarter turn and holds the standard and its frame elevated.

Mounted upon the table 2, adjacent the cutting-bed 4, is a mold-box 29, which is designed to receive the slabs cut from the tub package in the manner heretofore described, this mold-box having an open top-portion 30 and a removable molding and regulating cover 31, said cover being composed of a thin metal plate having slots 32 which engage and lock with adjustable headed bolts 33 mounted in the sides of the mold box, as clearly shown in Fig. 7, clamping and adjusting nuts 34 being provided at the lower ends of these bolts so that they may be readily manipulated to clamp the removable cover 31 in place. Secured to the plate 31 on its under side is a molding and regulating plate 35 by means of which the slabs or broken pieces of butter passing through the mold box are compressed and regulated, and on the upper side of the plate 31 is mounted a block or bar 36 which prevents scraping of the butter slab on the sharp end of the cover 31 and smearing of the same.

In the forward end of the mold box is mounted a butter forcing plunger 37, which is provided with supporting frames 38, said frames being linked by means of a link 39 with a lever 40 on a rock shaft 41, journaled transversely of the mold box and having an operating handle 42 (see Fig. 1). This construction gives a quick-moving plunger and is preferable to a gear and rack driven plunger for this reason. In order to provide the necessary clearance for the link 39 and lever 40, the cover 43 of the mold box is slotted at 44, and preferably the apron 46 with which the plunger 37 is provided at its top to close the mold box opening 30, is slotted at 47 to give free play to the link and lever.

When the butter is to be forced through the mold box, to form it into prints, a slab is taken from the cutting bed, dropped endwise into the mold-box through the opening 30, and the plunger 37 thrown forward. This cuts off a brick at a time and forces them through the mold-box, where they are molded into a solid mass ready for print-cutting, the apron 46 supporting the slab as the plunger moves forward. As the butter passes through the mold-box it is forced under the usual printing wheel 48 which is adjustably mounted at the delivery end of the mold-box. When the outside pieces of the package of butter, together with any broken fragments are to be formed into prints, they will be worked through the opening 30 in the mold box, and then as the plunger 37 is brought forward they will be forced through the mold-box 29, past the molding and regulating projection 35 on the under side of the plate 31, which plate will mold and form the fragments into a solid mass without unnecessary crushing of the butter.

Mounted at the delivery end of the mold-box 29 is a print cutter by which the molded and printed slab is severed into prints of appropriate sizes, and this print cutter is made up of a plurality of U-shaped frames 49, which frames, as shown in Fig. 8, are clamped between two clamping plates 50, the handle 51 for operating the print-cutter being carried by one of these clamping plates. The legs of the U-shaped frames 49 support the cutting wires 52 of the print-cutter and in order to steady and position the frames 49, I preferably provide the tie-bar 53, which is threaded on to the upper legs of the U-shaped frames and serves to hold them in proper position and the wires 52 accurately spaced. The lower legs of the U-shaped frames are slidably mounted in runways in the bed of the mold-box, as clearly shown in Figs. 5 and 6, and these runways are preferably formed by means of slotted tubes 54, so that the wires 52 of the print cutter are free to move in the slots of the tubes and yet the cutter will be held in accurate cutting position. In order to give proper clearance for the ends of the lower legs and the cutting wires 52 and to guide said cutting wires accurately to the slots in the runways 54, I preferably chamfer or incline the ends of the tubes 54 as at 55 (see Fig. 11) so that the sliding movements of the print-cutter will be smooth in both directions, and to secure a close-fitting loop at the ends of the cutting wires, I taper the ends of the legs of the U-shaped frames 49, so that the loops draw close and slide freely in the tubes 54 without scraping.

The butter as it issues from the mold-box will be severed into a number of prints by means of this print cutter and as the severed butter is forced forward the cut off prints will move down the inclined bed 56 (see Fig. 2), and as they pass from the horizontal surface of the mold box bottom to this inclined bed 56, they will be slightly tilted so as to break them apart and separate them on the line of cut, and they may be more readily taken off singly and handled by the operator or wrapper.

While I have shown and described a particular embodiment of my invention, it is obvious that numerous changes may be made within the range of mechanical skill without departing from the spirit thereof, and I do not, therefore, limit myself to any of the details of construction shown and described except in so far as I am limited by the prior art to which this invention belongs.

Having disclosed my invention, I claim;

1. In a machine of the class described and in combination, a cutting bed, a cutter-frame movable toward and from said bed, and a guard-plate open at one side carried by said cutter frame.

2. In a machine of the class described and in combination, a cutting bed, a cutter-frame movable toward and from said bed, and a frontless guard-plate having sides of less length than the cutter-frame.

3. In a machine of the class described, the combination with a cutting-bed, of a cutter-frame movable toward and from said bed, and supporting standards for said frame removably connected therewith.

4. In a machine of the class described, the combination with a cutting-bed, of a cutter frame movable toward and from said bed, and supporting standards removably and adjustably connected at their upper ends to said frame.

5. A butter-cutter comprising a frame, T-shaped clamps having integral wire-engaging hooks adjustably mounted on said frame, and cutting wires secured to said hooks.

6. A butter-cutter comprising a frame, cutting wires stretched across said frame, and a gage-plate having transverse slots on opposite sides to engage and position said wires.

7. A butter-cutter comprising a frame, cutting wires stretched across said frame, and a gage-plate having inclined transverse slots to engage and position said wires.

8. A butter-cutter comprising a frame, cutting wires stretched across said frame, and a gage-plate having on opposite sides inclined transverse slots to engage and position said cutting wires.

9. A butter-cutter comprising a frame, cutting wires stretched across said frame, and a gage having two relatively movable wire-engaging and positioning plates.

10. A butter-cutter comprising a frame, cutting wires stretched across said frame, and a gage having two relatively movable wire-engaging and positioning plates provided with transverse registering slots to receive the wires.

11. A butter-cutter comprising a frame, cutting wires stretched across said frame, and a gage having two relatively movable wire-engaging and positioning plates provided with inclined transverse registering slots to receive the wires.

12. A butter-cutter comprising a frame, cutting wires stretched across said frame, and a gage having two relatively movable wire-engaging and positioning plates provided on opposite sides with inclined transverse registering slots to receive the wires.

13. A butter-cutter comprising a frame, cutting wires stretched across said frame, and a gage having two pivotally connected plates provided with registering transverse slots to engage and position the wires.

14. A butter-cutter comprising a frame, cutting wires stretched across said frame, and a gage consisting of two plates pivotally connected at their center and having transverse registering slots on opposite sides thereof to engage and position the wires.

15. A butter-cutter comprising a frame, cutting wires stretched across said frame, a gage consisting of two pivotally connected plates having transverse registering slots to engage and position the wires, and locking means to secure said plates in wire-engaging position.

16. A butter-cutter comprising a frame, cutting wires stretched across said frame, a gage consisting of two pivotally connected plates having transverse registering slots to engage and position the wires, and a locking stud on one plate to lock the plates together.

17. In a machine of the class described and in combination, a mold-box having an open-topped middle section, a plunger in one end of said box adapted to reciprocate across said middle section, a fixed cover plate for the plunger end of said mold-box, and a cover plate having molding and regulating faces detachably secured to and readily removable from the other end of said mold-box.

18. In a machine of the class described and in combination a mold-box having an open-topped middle section, an aproned plunger in one end of said box adapted to reciprocate across said middle section, a rock-shaft having a plunger-operating lever mounted transversely of said box, a link connection between said lever and plunger, a fixed cover plate for the plunger end of said box having a slot to receive said plunger operating link, and a removable plate for the other end of the box having butter-molding and regulating means.

19. In a machine of the class described and in combination, a mold-box having an open topped butter-receiving section, a butter forcing plunger in one end of said mold-box movable therethrough a butter-molding and regulating cover-plate at the other end of said mold-box, a print cutter movable transversely across said mold-box at its delivery end, and an inclined receiving bed adjacent said print cutter to tilt and separate the prints.

20. In a machine of the class described and in combination, a mold-box, means for forcing the butter through said box, means for cutting prints from the molded slab, and an inclined receiving table adjacent said print-cutting means to tilt and separate the prints.

21. In a machine of the class described and in combination, a mold-box, means for forcing the butter through said box, a print cutter comprising wire supporting frames, and slotted runways in the bed of said mold-box to receive said frames.

22. In a machine of the class described and in combination, a mold-box, means for forcing the butter through said box, a print cutter comprising a plurality of U-shaped wire-supporting frames clamped together, a tie bar spanning the upper legs of said frames, and slotted runways in the bed of said mold-box to receive the lower legs of said frames.

23. In a machine of the class described and in combination, a mold-box, means for forcing the butter through said box, a print cutter movable across said mold-box at the delivery end thereof, and comprising a plurality of U-shaped wire-supporting frames and a clamping handle, a tie-bar spanning the upper legs of said frames, and slotted tubes set into the bed of the mold-box to receive and form runways for the lower legs of said frames.

24. In a machine of the class described and in combination, a mold-box, means for forcing butter through said box, a print cutter at the delivery end of said box comprising a U-shaped frame having a cutting wire stretched across its open end, and a slotted tube having a chamfered or inclined end set in the bed of the mold-box to receive and form a runway for said frame.

25. Print-cutting mechanism for butter-cutting machines comprising a U-shaped cutter frame having leg tips of smaller cross-sectional area than the legs proper, and a cutting wire spanning said frame and looped over said reduced tips so as to lie within the plane of the legs.

26. A wire-supporting clamp for butter-cutting machines of substantially U-shape, and a reversely-turned wire-receiving hook on one of the legs of said clamp.

27. In combination with a cutter-frame, a wire-supporting clamp of substantially U-shape adjustably mounted on said frame, a reversely-turned wire-receiving hook on one of the legs of said clamp, and an adjusting screw in the bend of the clamp to impinge against said frame.

In testimony whereof I have hereunto set my hand in presence of two subscribing witnesses.

RICHARD F. STEWART.

Witnesses:
KATHERINE GLANVILLE,
WILLIAM A. PRATT.

It is hereby certified that in Letters Patent No. 886,088, granted April 28, 1908, upon the application of Richard F. Stewart, of Pocantico Hills, New York, for an improvement in "Butter-Cutting Machines," an error appears in the printed specification requiring correction, as follows: In line 69, page 3, the compound word "T-shaped" should read *U-shaped;* and that the said Letters Patent should be read with this correction therein that the same may conform to the record of the case in the Patent Office.

Signed and sealed this 12th day of May, A. D., 1908.

[SEAL.]

C. C. BILLINGS,
*Acting Commissioner of Patents.*